United States Patent
Schuler

(12) 
(10) Patent No.: US 6,518,704 B1
(45) Date of Patent: Feb. 11, 2003

(54) METHOD AND DEVICE FOR AUTOMATICALLY SWITCHING ON OR OFF THE LIGHTS OF A VEHICLE

(75) Inventor: Thomas Schuler, Wiernsheim (DE)

(73) Assignee: Valeo Auto-Electric Wischer und Motoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/744,006
(22) PCT Filed: May 10, 2000
(86) PCT No.: PCT/EP00/04170
§ 371 (c)(1), (2), (4) Date: Feb. 9, 2001
(87) PCT Pub. No.: WO00/69679
PCT Pub. Date: Nov. 23, 2000

(30) Foreign Application Priority Data

May 18, 1999 (DE) .......................................... 199 22 687

(51) Int. Cl.[7] .............................................. H05B 37/02
(52) U.S. Cl. .............................. 315/82; 315/83; 307/10.8
(58) Field of Search ................................ 315/76, 80, 81, 315/82; 307/10.8

(56) References Cited

U.S. PATENT DOCUMENTS 6,229,263 B1 * 5/2001 Izawa ........................... 315/80

FOREIGN PATENT DOCUMENTS

| DE | 195 23 262 | 1/1997 |
| DE | 197 04 818 | 8/1997 |
| DE | 196 30 216 | 1/1998 |

* cited by examiner

*Primary Examiner*—David Vu
(74) *Attorney, Agent, or Firm*—J. Gordan Lewis

(57) ABSTRACT

A method and device to automatically switch on and off the lights of a motor vehicle. The driving speed of the vehicle and the brightness readings from three light sensor cones of different sizes and directed in different directions are determined. The lights are switched either on or off based upon comparing the speed and three brightness readings to a set of possible conditions for each of the variables as the vehicle operates. The driving distance and time interval are also variables considered in determining whether to switch the lights on or off. Unnecessary on and off switching is avoided.

22 Claims, 3 Drawing Sheets

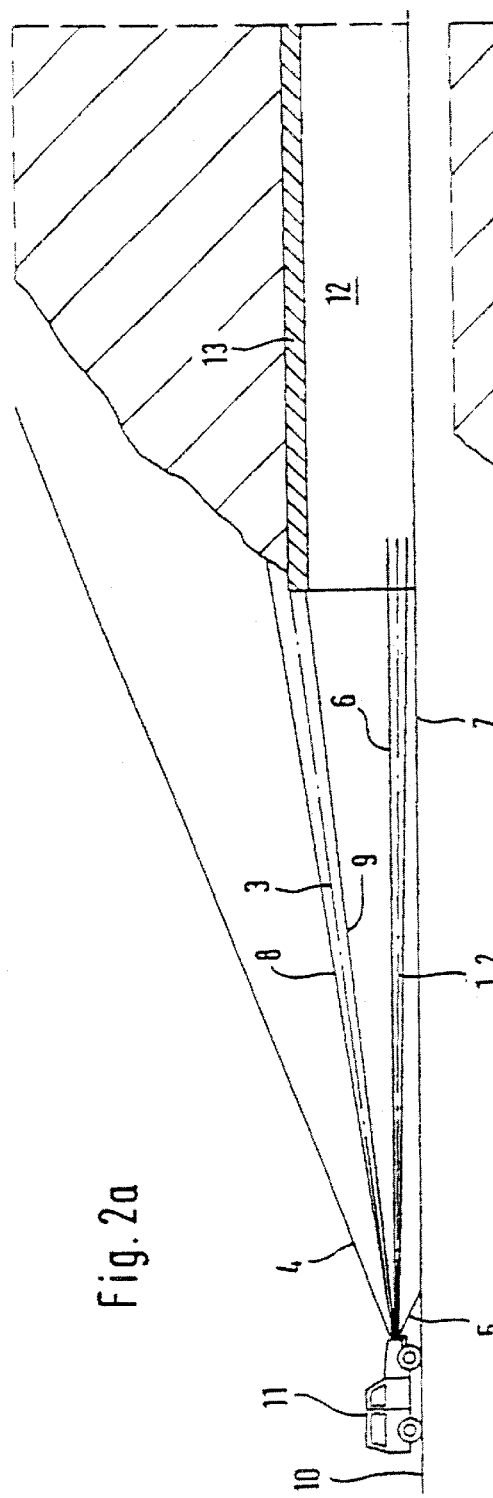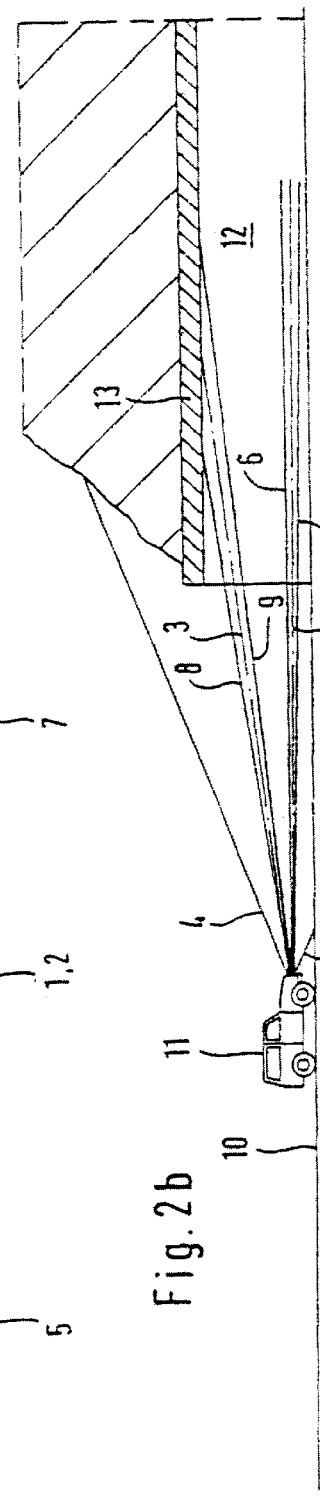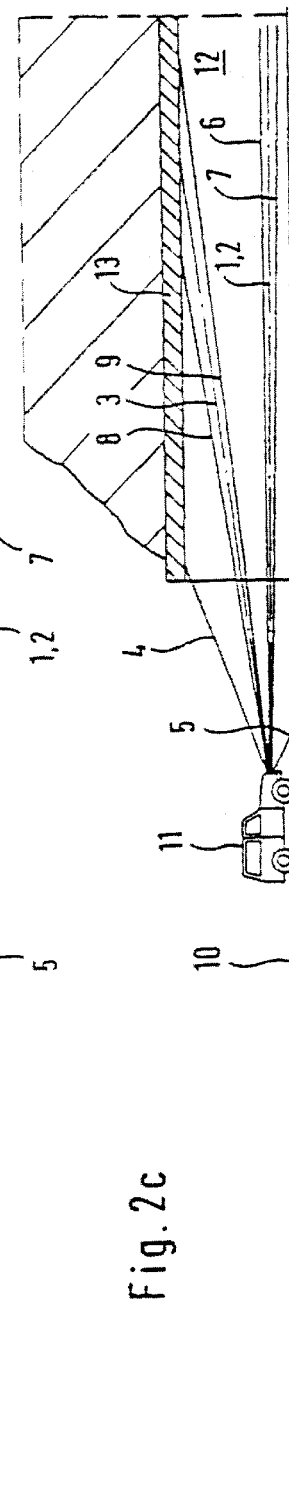
Fig. 2a
Fig. 2b
Fig. 2c

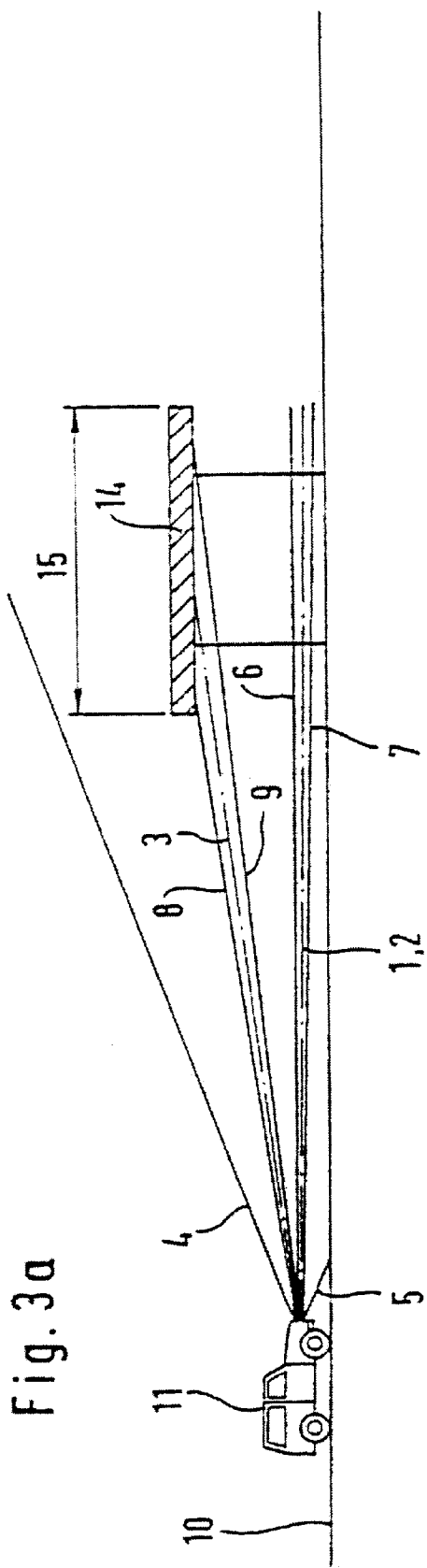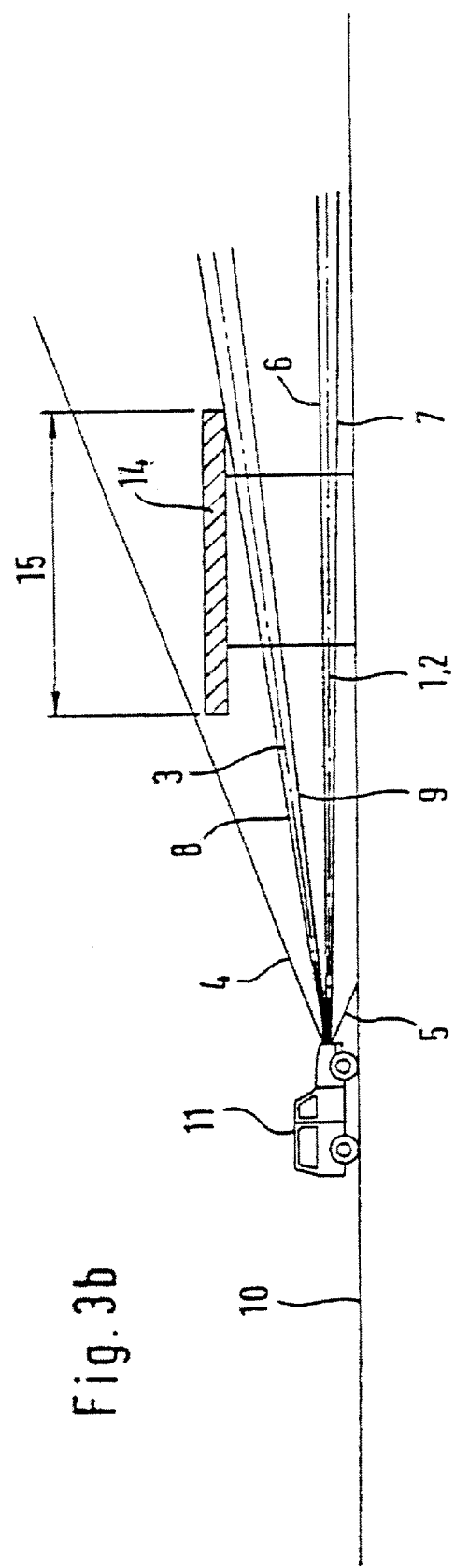

METHOD AND DEVICE FOR AUTOMATICALLY SWITCHING ON OR OFF THE LIGHTS OF A VEHICLE

BACKGROUND

The invention pertains to methods and devices for automatically switching on or off the lights of a vehicle.

In order to improve the safety and comfort of motor vehicles, many functions have been automated, thereby unburdening the driver. In one known method, the lights of the vehicle are automatically switched on and off as a function of brightness. Two light sensors are used: the first determines the brightness of the vehicle surroundings and switches on the lights of the vehicle as soon as the ambient brightness falls below a predetermined minimum brightness level. The second light sensor determines only the brightness in the driving direction and thus is able to determine whether the vehicle approaches a tunnel opening, e.g., in which case the second light sensor switches on the lights of the vehicle even though the ambient if brightness still exceeds the aforementioned minimum brightness level until the vehicle enters the tunnel. One disadvantage of this method is that short, dark sections are not recognized as such, so that the lights of the vehicle frequently switch on and then off again shortly thereafter, as is the case, for example, when driving beneath a bridge that spans the road. Drivers coming from the opposite direction may become annoyed; in any case, the service life of the gas discharge lamps is significantly reduced by these frequent switching processes.

SUMMARY

The present invention is based on the object of making available a method and device, by which means the lights of a vehicle are reliably switched on if the ambient brightness is too low or if the vehicle enters a tunnel. Moreover, the lights of the vehicle are prevented from switching on and then off again a short time later when driving through short, dark sections.

According to the invention, this objective is realized with a method in which the driving speed is determined, the mean brightness $H_1$ within a first cone that lies in front of the vehicle, looking into the driving direction, is determined, where the first cone has a large cone angle, and where the tip of the cone lies inside the vehicle, the mean brightness $H_2$ within a second cone that lies in front of the vehicle, looking into the driving direction, is determined, where the cone angle of the second cone is smaller than that of the first cone, and where the tip of the second cone lies inside the vehicle, the mean brightness $H_3$ within a third cone that lies in front of the vehicle, looking into the driving direction, is determined, where the cone angle of the third cone is smaller than that of the first cone, the tip of the third cone lies inside the vehicle, where the longitudinal axis of the third cone is elevated in the driving direction relative to the longitudinal axis of the second cone, as viewed from the side, and where the envelope of the third cone that lies outside its tip is located within the envelope of the first cone, the lights of the vehicle are switched on if the driving speed is greater than zero, and the brightness values $H_1$, $H_2$ and $H_3$ fall below a minimum value $H_{min,1}$ over a driving distance $S_1$ or the driving speed is greater than zero, and the brightness value $H_2$ is less than the brightness value $H_1$ by an amount $\Delta H_{min,1}$ and the brightness value $H_3$ is greater than the brightness value $H_2$ by less than an amount $\Delta H_{min,2}$ over a driving distance $S_1$ or the driving speed is equal to zero, the ignition is switched on and the brightness values $H_1$, $H_2$ and $H_3$ fall below a minimum value $H_{min,1}$ during a time interval $\Delta T_{min,1}$, and the lights of the vehicle are switched off if the driving speed is greater than zero and the brightness values $H_1$, $H_2$ and $H_3$ exceed a minimum value $H_{min,2}$ over a driving distance $S_1$ or the driving speed is equal to zero, the ignition is switched on and the brightness values $H_1$, $H_2$ and $H_3$ exceed a minimum value $H_{min,2}$ during a time interval $\Delta T_{min,2}$.

The method according to the invention provides the advantage that the brightness ahead of the vehicle is also determined by the third light sensor oriented, when viewed from the side, at an inclination relative to the longitudinal axis of the second cone. The evaluation of this additional information in accordance with the proposed method makes it possible to differentiate, for example, the ceiling of a tunnel from the underside of a bridge that passes over a road. In the method according to the invention, the lights of the vehicle are switched on before the vehicle enters the tunnel, with the lights of the vehicle remaining switched off if the vehicle drives beneath a bridge that passes over a road. Since the driving distance $S_1$ forms part of the switch-on and the switch-off condition, the speed of the vehicle is also taken into consideration. The method according to the invention also provides the advantage that the lights of the vehicle are only switched off if the brightness remains above a predetermined minimum level for a sufficient period of time.

According to the invention, the objective of the invention is also realized with a method in which the driving speed is determined, the mean brightness $H_1$ within a first cone that lies in front of the vehicle, looking into the driving direction, is determined, where the first cone has a large cone angle, and where the tip of the cone lies inside the vehicle, the mean brightness $H_2$ within a second cone that lies in front of the vehicle, looking into the driving direction, is determined, where the cone angle of the second cone is smaller than that of the first cone, and where the tip of the second cone lies inside the vehicle, the mean brightness $H_3$ within a third cone that lies in front of the vehicle, looking into the driving direction, is determined, where the cone angle of the third cone is smaller than that of the first cone, where the tip of the third cone lies inside the vehicle, where the longitudinal axis of the third cone is elevated in the driving direction relative to the longitudinal axis of the second cone, as viewed from the side, and where the envelope of the third cone that lies outside its tip is located within the envelope of the first cone, the lights of the vehicle are switched on if the driving speed is greater than zero, and the mean values of the brightness values $H_1$, $H_2$ and $H_3$ fall below a minimum value $H_{min,1}$ over a driving distance $S_1$ or
   the driving speed is greater than zero, and the mean value of the brightness value $H_2$ is less than the mean value of the brightness value $H_1$ by an amount $\Delta H_{min,1}$ and the mean value of the brightness value $H_3$ is greater than the mean value of the brightness value $H_2$ by less than an amount $\Delta H_{min,2}$ over a driving distance $S_1$
or
   the driving speed is equal to zero, the ignition is switched on and the mean values of the brightness values $H_1$, $H_2$ and $H_3$ fall below a minimum value $H_{min,1}$ during a time interval $\Delta T_{min,1}$, and
the lights of the vehicle are switched off if
   the driving speed is greater than zero and the mean values of the brightness values $H_1$, $H_2$ and $H_3$ exceed a minimum value $H_{min,2}$ over a driving distance $S_1$
or
   the driving speed is equal to zero, the ignition is switched on and the mean values of the brightness values $H_1$, $H_2$ and $H_3$ exceed a minimum value $H_{min,2}$ during a time interval $\Delta T_{min,2}$.

This method provides the advantage that brief fluctuations of one or more brightness values do not cause the lights of the vehicle to be unnecessarily switched on and off. The speed of the vehicle is also taken into consideration by determining mean values while traveling a distance $S_1$.

According to one variation of the method,
the driving speed is determined,
the mean brightness $H_1$ within a first cone that lies in front of the vehicle, looking into the driving direction, is determined, where the first cone has a large cone angle, and the tip of the cone lies inside the vehicle,
the mean brightness $H_2$ within a second cone that lies in front of the vehicle, looking into the driving direction, is determined, where the cone angle of the second cone is smaller than that of the first cone, and where the tip of the second cone lies inside the vehicle,
the mean brightness $H_3$ within a third cone that lies in front of the vehicle, looking into the driving direction, is determined, where the cone angle of the third cone is smaller than that of the first cone, where the tip of the third cone lies inside the vehicle, where the longitudinal axis of the third cone is elevated in the driving direction relative to the longitudinal axis of the second cone, as viewed from the side, and where the envelope of the third cone that lies outside its tip is located within the envelope of the first cone,
the lights of the vehicle are switched on if
   the driving speed is greater than zero, and the mean value formed by the brightness values $H_1$, $H_2$ and $H_3$ falls below a minimum value $H_{min,1}$ over a driving distance $S_1$
or
the driving speed is greater than zero and the mean value of the brightness value $H_2$ is less than the mean value of the brightness value $H_1$ by an amount $\Delta H_{min,1}$ and the mean value of the brightness value $H_3$ is greater than the mean value of the brightness value $H_2$ by less than an amount $\Delta H_{min,2}$ over a driving distance $S_1$
or
   the driving speed is equal to zero, the ignition is switched on and the mean value formed by the brightness values $H_1$, $H_2$ and $H_3$ falls below a minimum value $H_{min,1}$ during a time interval $\Delta T_{min,1}$, and the lights of the vehicle are switched off if
   the driving speed is greater than zero and the mean value formed by the brightness values $H_1$, $H_2$ and $H_3$ exceeds a minimum value $H_{min,2}$ over a driving distance $S_1$
or
   the driving speed is equal to zero, the ignition is switched on and the mean value formed by the brightness values $H_1$, $H_2$ and $H_3$ exceeds a minimum value $H_{min,2}$ during a time interval $\Delta T_{min,2}$.

This method according to the invention provides the advantage that the influence of "outliers" in the brightness values is additionally reduced due to the formation of a common mean value of the brightness values $H_1$, $H_2$ and $H_3$.

According to another variant of the method according to the invention, the mean value formed by the brightness values $H_1$, $H_2$ and $H_3$ is weighted, with the brightness value $H_1$ given the heaviest weight, so that the influence of the brightness values $H_2$ and $H_3$ is reduced in comparison to $H_1$ and the influence of the ambient brightness on the switching on or off of the vehicle lights is correspondingly increased.

The initially cited objective is also realized with a device for implementing the method according to the invention which contains a first light sensor for determining the mean brightness $H_1$ of the light beams within a cone with a large cone angle, a second light sensor for determining the mean brightness $H_2$ of the light beams within a cone with a small cone angle, where the envelope of the second cone, which is located beyond the tip, lies within the envelope of the first cone, a light control unit that switches the lights of the vehicle on and off in accordance with a method disclosed in one of the preceding claims, and a third light sensor for determining the mean brightness $H_3$ of the light beams within a third cone with a small cone angle, where the envelope of the third cone, which is located beyond the tip, lies within the envelope of the first cone, and where the longitudinal axis of the third cone forms a small angle with the longitudinal axis of the second cone.

This device provides the advantages that an additional brightness value is determined that is absolutely imperative for reliably switching the vehicle lights on and off, and that the light control unit switches the lights of the vehicle on and off in accordance with a method disclosed in one of the preceding claims.

According to one advantageous embodiment of the invention, the cone angle of the first cone is greater than 10°, so that a sufficiently large portion of the ambient light is used for determining the brightness value $H_1$.

According to another advantageous embodiment of the invention, the cone angle of the first cone is 28°, so that a certain selected portion of the ambient light is used for determining the brightness value $H_1$.

According to another advantageous embodiment of the invention, the cone angle of the second and/or third cone is less than 5°, in particular, 1.2°, so that a directional or nearly point-wise determination of the brightness values $H_2$ and/or $H_3$ takes place.

In another embodiment of the invention, the longitudinal axes of the first and the second cone extend parallel to one another. In this case, it is advantageous that the light sensors be arranged parallel to one another.

In another embodiment, the angle between the longitudinal axes of the second and the third cone is less than 5°, so that the brightness value $H_3$ decreases long before the vehicle enters a tunnel or passes beneath a bridge.

According to another advantageous embodiment of the invention, $\Delta H_{min,1}$ is the product of a factor between zero and one and the brightness value $H_1$, such that the ambient brightness influences the switching on of the vehicle lights. In this way, the differences in brightness between a clear summer day and a cloudy winter day can be taken into consideration.

According to another advantageous embodiment of the invention, $\Delta H_{min,2}$ is the product of a factor between zero and one and the brightness value $H_2$, such that the brightness of a region which lies in front of the vehicle influences the switching on of the vehicle lights.

According to another advantageous embodiment of the invention, the brightness value $H_{min,1}$ and the brightness value $H_{min,2}$ can be freely selected such that the user of the device is able to adapt the switching on or off of the vehicle lights to individual requirements.

According to another advantageous embodiment of the invention, the brightness values $H_1$, $H_2$ and $H_3$ are evaluated during a time interval $\Delta T$ such that the data quantity is reduced and the method according to the invention can be carried out more easily.

The initially cited objective is also realized with a vehicle equipped with a device according to the invention, in which the longitudinal axes of the first and second cone extend in the direction of the longitudinal axis of the vehicle, and in which the longitudinal axis of the third cone extends in the direction of the longitudinal axis of the vehicle as seen from above.

This vehicle provides the advantages that the device according to the invention can be securely connected to the vehicle and that a high operational reliability is ensured.

According to another advantageous embodiment of the invention, the longitudinal axes of the first and the second cone extend in the driving direction of the vehicle, and the longitudinal axis of the third cone extends in the driving direction, as seen from above, such that the brightness in the driving direction can be determined. This is advantageous on tortuous roads, particularly if a tunnel entrance or exit lies on a curve.

According to another variant, the longitudinal axes of the first and the second cone extend in the steering direction of the front wheels, and the longitudinal axis of the third cone extends in the steering direction of the front wheels, as seen from above, such that the device according to the invention can be easily and inexpensively adjusted when the driving direction of the vehicle changes.

According to another advantageous embodiment of the invention, the longitudinal axes of the first, second and third cones can be freely selected such that the device can be adapted, for example, to different load conditions or asymmetric vehicles.

Additional advantages and advantageous embodiments of the invention are disclosed in the following description, the figures and the claims.

BRIEF DESCRIPTION OF THE DRAWINGS

One embodiment of the invention is illustrated in the figures and described in greater detail below.

The figures show:

FIGS. 2a–2c are pictorial representations of the vehicle according to FIG. 1 approaching a tunnel; and FIGS. 3a–3b are pictorial representations of the vehicle according to FIG. 1 approaching a bridge that passes over the road.

DETAILED DESCRIPTION

Figure 1:
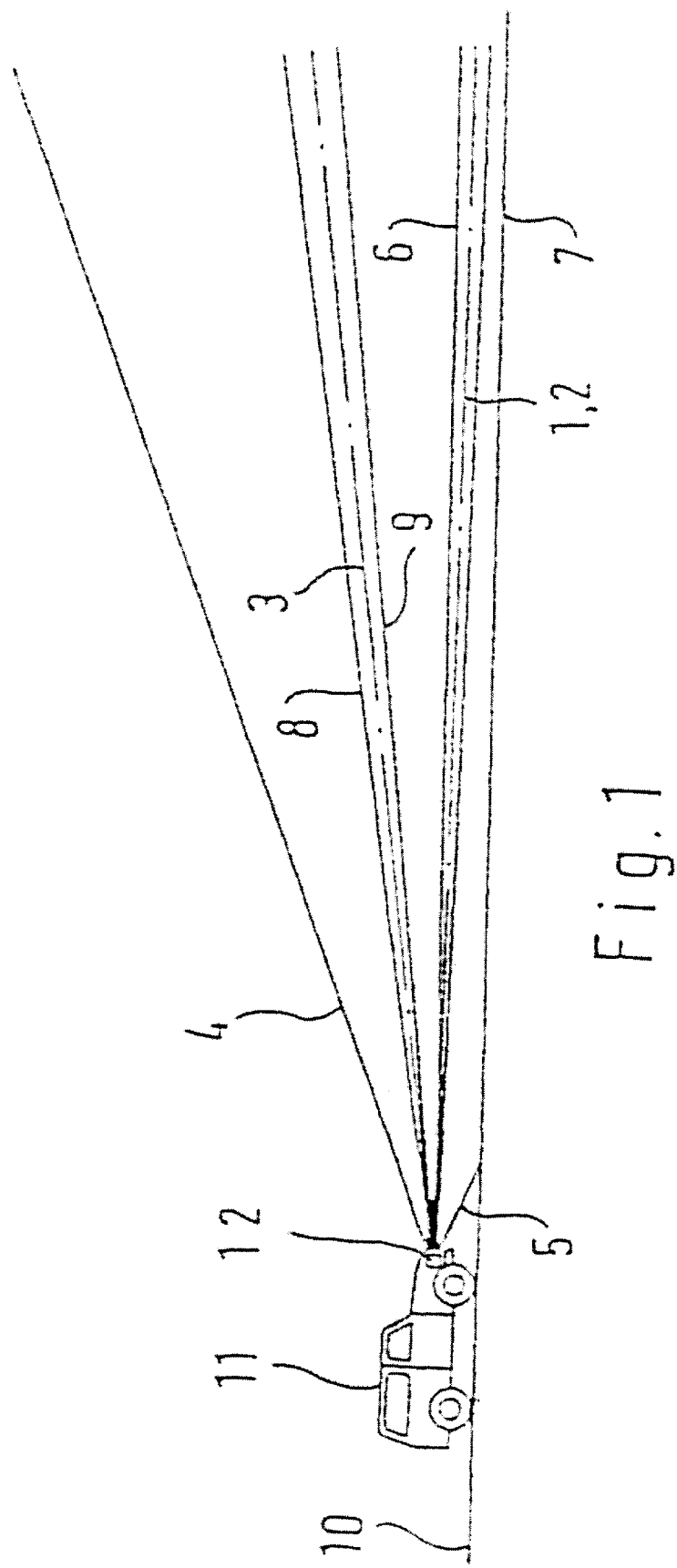
FIG. 1 is a pictorial representation of a vehicle equipped with a device according to the invention.

FIG. 1 shows a vehicle 11 driven on a road 10. A device 12 according to the invention for automatically switching the lights of the vehicle on or off (not illustrated in detail) is installed on the front side of the vehicle 11. This figure also shows three cones, within which three light sensors determine the respective brightness. These cones are respectively illustrated with longitudinal axes 1, 2 and 3 for the first, second and third cones as well as with envelope surface lines 4 and 5 for the first cone, lines 6 and 7 for the second cone, and lines 8 and 9 for the third cone. However, it would also be conceivable to determine the brightness of a point with the aid of the aforementioned light sensors instead of the brightness within the respective cones. In this case, the cone angle would be 0°. If the vehicle 11 is driven on an open road as shown in FIG. 1, all three sensors approximately measure the same brightness. As soon as the determined brightness values drop below the predetermined minimum brightness value $H_{min,1}$, e.g., due to nightfall or because the vehicle 11 is located in an underground parking garage, the lights of the vehicle 11 are switched on using a light control unit of the device 12 in accordance with the first switch-on condition of the method of the invention. If the vehicle 11 is at a standstill in a traffic jam when the ignition is switched on, the lights of the vehicle 11 are switched on at nightfall due to the third switch-on condition of the method of the invention. If the vehicle 11 is used at night, the lights of the vehicle 11 remain switched on because none of the switch-off conditions defined in the method of the invention are met. The lights of the vehicle 11 are only switched off using the light control unit of the device 12 if the ambient brightness surrounding the vehicle 11 lies above a minimum value $H_{min,2}$ while traveling a certain distance $S_1$ (not shown) or for a certain period of time.

FIGS. 2a–2c show the vehicle 11 approaching a tunnel 12 at three different stages. In FIG. 2a, the vehicle 11 is far from the tunnel entrance. This is the reason the first and third light sensors still determine the ambient brightness surrounding the vehicle 11. Only the second light sensor which determines the brightness within the cone defined by the envelope surface lines 6 and 7 already determines the brightness in the interior of the tunnel 12 which is significantly less than that of the surroundings. In FIG. 2b, the vehicle 11 is closer to the tunnel entrance. This is the reason the cone defined by the envelope surface lines 8 and 9, within which the brightness is determined by the third light sensor, is incident on the tunnel ceiling 13 such that the third light sensor also determines the brightness of the tunnel ceiling which is significantly less than that of the surroundings of the vehicle. If this condition continues beyond the driving distance $S_1$, the lights of the vehicle are switched on in accordance with the second switch-on condition. The driving distance $S_1$ approximately corresponds to the width 15 of a bridge 14 that passes over the road such that the lights are not unnecessarily switched on or off while passing beneath a bridge 14.

The lights of the vehicle switch on before the vehicle enters the tunnel 12 because the third light sensor determines the brightness of the tunnel ceiling 13 long before the vehicle 11 reaches the tunnel 12 due to the slight inclination of the longitudinal axis 3 of the third cone relative to the road 10. This is elucidated in the form of a comparison between FIGS. 2b and 2c. In FIG. 2c, the vehicle 11 is located close enough to the tunnel entrance for the first light sensor to determine the brightness of the tunnel 12, so that the lights of the vehicle switch on no later than this moment.

FIGS. 3a and 3b show a situation in which a vehicle 11 equipped with a device 12 according to the invention is driven beneath a bridge 14 that passes over the road. The situation in FIG. 3a is comparable to the situation shown in FIG. 2b. The light sensors having cones with the longitudinal axes 2 and 3 already determine a brightness that is lower than the brightness of the surroundings, but this condition only continues over a distance that corresponds to the width 15 of the bridge 14 because the light sensor having a cone with the longitudinal axis 3 subsequently determines the brightness of the surroundings again. This is elucidated in FIG. 3b. The lights of the vehicle 11 remain switched off because none of the switch-on conditions is fulfilled when approaching and driving beneath a bridge 14 that passes over the road 10.

The method according to the invention is not limited to switching the lights of a vehicle on and off. It may also be used to control other functions of the vehicle 11. For example, the vehicle 11 ventilation system can be switched off or switched to circulation mode or the sound system of the car can be changed from the radio to cassette or CD mode when entering a tunnel 14.

All characteristics disclosed in the description and the following claims and illustrated in the figures may be essential to the invention individually as well as in arbitrary combination.

What is claimed is:

1. A method for automatically switching the lights of a vehicle on and off, comprising the steps of:
   A) determining the driving speed of the vehicle;
   B) determining the brightness $H_1$ within a first cone that lies in front of the vehicle, looking into the driving direction, where the first cone has a large cone angle, and where the tip of the cone lies inside the vehicle;
   C) determining the brightness $H_2$ within a second cone that lies in front of the vehicle, looking into the driving direction, where the cone angle of the second cone is smaller than that of the first cone, and where the tip of the second cone lies inside in the vehicle;
   D) determining the brightness $H_3$ within a third cone that lies in front of the vehicle, looking into the driving direction, where the cone angle of the third cone is smaller than that of the first cone, where the tip of the third cone lies inside the vehicle, where the longitudinal axis of the third cone is elevated in the driving direction relative to the longitudinal axis of the second cone, as viewed from the side, and where the envelope of the third cone that lies outside its tip is located within the envelope of the first cone;
   E) switching the lights of the vehicle on if at least one of:
      the driving speed is greater than zero and the brightness values $H_1$, $H_2$ and $H_3$ each fall below a minimum value $H_{min,1}$ over a driving distance $S_1$;
      the driving speed is greater than zero and the brightness value $H_2$ is less than the brightness value $H_1$ by an amount $\Delta H_{min,1}$ over a driving distance $S_1$ and the brightness value $H_3$ is greater than the brightness value $H_2$ by less than an amount $\Delta H_{min,2}$ over a driving distance $S_1$; and
      the driving speed is equal to zero and the ignition is switched on and the brightness values $H_1$, $H_2$ and $H_3$ each fall below a minimum value $H_{min,1}$ during a time interval $\Delta T_{min,1}$; and
   F) switching the lights of the vehicle off if one of:
      the driving speed is greater than zero and the brightness values $H_1$, $H_2$ and $H_3$ each exceed a minimum value $H_{min,2}$ over a driving distance $S_1$; and
      the driving speed is equal to zero and the ignition is switched on and the brightness values $H_1$, $H_2$ and $H_3$ each exceed a minimum value $H_{min,2}$ during a time interval $\Delta T_{min,2}$.

2. A method for automatically switching the lights of a vehicle on and off, comprising the steps of:
   A) determining the driving speed of the vehicle;
   B) determining the brightness $H_1$ within a first cone that lies in front of the vehicle, looking into the driving direction, where the first cone has a large cone angle, and where the tip of the cone lies inside the vehicle;
   C) determining the brightness $H_2$ within a second cone that lies in front of the vehicle, looking into the driving direction, where the cone angle of the second cone is smaller than that of the first cone, and where the tip of the second cone lies inside the vehicle;
   D) determining the brightness $H_3$ within a third cone that lies in front of the vehicle, looking into the driving direction, where the cone angle of the third cone is smaller than that of the first cone, where the tip of the third cone lies inside the vehicle, where the longitudinal axis of the third cone is elevated in the driving direction relative to the longitudinal axis of the second cone, as viewed from the side, and where the envelope of the third cone that lies outside its tip is located within the envelope of the first cone;
   E) switching the lights of the vehicle on if at least one of:
      the driving speed is greater than zero and the mean values of the respective brightness values $H_1$, $H_2$ and $H_3$ each fall below a minimum value $H_{min,1}$ over a driving distance $S_1$;
      the driving speed is greater than zero and the mean value of the brightness value $H_2$ is less than the mean value of the brightness value $H_1$ by an amount $\Delta H_{min,1}$ over a driving distance $S_1$ and the mean value of the brightness value $H_3$ is greater than the mean value of the brightness value $H_2$ by less than an amount $\Delta H_{min,2}$ over a driving distance $S_1$; and
      the driving speed is equal to zero and the ignition is switched on and the mean values of the respective brightness values $H_1$, $H_2$ and $H_3$ each fall below a minimum value $H_{min,1}$ during a time interval $\Delta T_{min,1}$; and
   F) switching the lights of the vehicle off if one of:
      The driving speed is greater than zero and the mean values of the respective brightness values $H_1$, $H_2$ and $H_3$ each exceed a minimum value $H_{min,2}$ over a driving distance $S_1$; and
      the driving speed is equal to zero and the ignition is switched on and the mean values of the respective brightness values $H_1$, $H_2$ and $H_3$ each exceed a minimum value $H_{min,2}$ during a time interval $\Delta T_{min,2}$.

3. A method for automatically switching the lights of a vehicle on and off, comprising the steps of:
   A) determining the driving speed of the vehicle;
   B) determining the brightness $H_1$ within a first cone that lies in front of the vehicle, looking into the driving direction, where the first cone has a large cone angle, and where the tip of the cone lies inside the vehicle;
   C) determining the brightness $H_2$ within a second cone that lies in front of the vehicle, looking into the driving direction, where the cone angle of the second cone is smaller than that of the first cone, and where the tip of the second cone lies inside the vehicle;
   D) determining the brightness $H_3$ within a third cone that lies in front of the vehicle, looking into the driving direction, where the cone angle of the third cone is smaller than that of the first cone, where the tip of the third cone lies inside the vehicle, where the longitudinal axis of the third cone is elevated in the driving direction relative to the longitudinal axis of the second cone as viewed from the side, and where the envelope of the third cone that lies outside its tip is located within the envelope of the first cone;

E) switching the lights of the vehicle on if at least one of:

the driving speed is greater than zero and the mean value formed by the brightness values $H_1$, $H_2$ and $H_3$ falls below a minimum value $H_{min,1}$ over a driving distance $S_1$;

the driving speed is greater than zero and the mean value of the brightness value $H_2$ is less than the mean value of the brightness value $H_1$ by an amount $\Delta H_{min,1}$ over a driving distance $S_1$ and the mean value of the brightness value $H_3$ is greater than the mean value of the brightness value $H_2$ by less than an amount $\Delta H_{min,2}$ over a driving distance $S_1$; and the driving speed is equal to zero and the ignition is switched on and the mean value formed by the brightness values $H_1$, $H_2$ and $H_3$ falls below a minimum value $H_{min,1}$ during a time interval $\Delta T_{min,1}$; and F) switching the lights of the vehicle off if one of:

the driving speed is greater than zero and the mean value formed by the brightness values $H_1$, $H_2$ and $H_3$ exceeds a minimum value $H_{min,2}$ over a driving distance $S_1$; and the driving speed is equal to zero and the ignition is switched on and the mean value formed by the brightness values $H_1$, $H_2$ and $H_3$ exceeds a minimum value $H_{min,2}$ during a time interval $\Delta T_{min,2}$.

4. The method according to claim 3, comprising the steps of:

weighing the mean value formed by the brightness values $H_1$, $H_2$ and $H_3$; and giving the brightness value $H_1$ the heaviest weight.

5. A device for automatically switching lights of a vehicle on and off comprising:

a first light sensor that determines the brightness of the surroundings of the vehicle;

a second light sensor that determines the brightness in the driving direction;

a light control unit that switches the lights of the vehicle on and off, wherein the first light sensor does the brightness $H_1$ within a first cone, the first cone having a large cone angle, and the second light sensor determines the brightness $H_2$ within a second cone with a small cone angle, where the envelope of the second cone, which is located beyond the tip, lies within the envelope of the first cone; and a third light sensor determining the brightness $H_3$ within a third cone with a small cone angle, where the envelope of the third cone, which is located beyond the tip, lies within the envelope of the first cone, and the longitudinal axis of the third cone forms a small angle with the longitudinal axis of the second cone; and wherein the light control unit switches the lights of the vehicle on and off in accordance with inputs from the first light sensor, the second light sensor and the third light sensor.

6. The device according to claim 5 wherein the cone angle of the first cone is greater than 10°.

7. The device according to claim 6 wherein the cone angle of the first cone is 28°.

8. The device according to claim 5 wherein the cone angle of the second cone is less than 5°.

9. The device according to claim 8 wherein the cone angle of the second cone is 1.2°.

10. The device according to claim 5 wherein the cone angle of the third cone is less than 5°.

11. The device according to claim 10 wherein the cone angle of the third cone is 1.2°.

12. The device according to claim 5 wherein longitudinal axes of the first and the second cone are parallel.

13. The device according to claim 5 wherein an angle between longitudinal axes of the second cone and the third cone is less than 5°.

14. The device according to claim 5 wherein control of the lights of a vehicle are based on a function of $H_1$, $H_2$ and $H_3$ compared to predetermined values $H_{min,1}$ and $H_{min,2}$ over a driving distance $S_1$ when a driving speed of the vehicle is greater than zero and based on a function of $H_1$, $H_2$ and $H_3$ compared to predetermined values $H_{min,1}$ and $H_{min,2}$ during time intervals $\Delta T_{min,1}$ and $\Delta T_{min,2}$ when the driving speed of the vehicle is equal to zero and wherein $\Delta H_{min,1}$ is the product of a factor between zero and one and the brightness value $H_1$.

15. The device according to claim 14 wherein $\Delta H_{min,2}$ is the product of a factor between zero and one and the brightness value $H_2$.

16. The device according to claim 15 wherein the brightness value $H_{min,1}$ and the brightness value $H_{min,2}$ can be selected freely.

17. The device according to claim 16 wherein the brightness values $H_1$, $H_2$ and $H_3$ are evaluated during a time interval $\Delta T$.

18. The device according to claim 5 wherein the longitudinal axes of the first and the second cone extend in the direction of the longitudinal axis of the vehicle, and the longitudinal axis of the third cone extends in the direction of the longitudinal axis of the vehicle, as viewed from above.

19. The device according to claim 5 wherein the longitudinal axes of the first and the second cone extend in the driving direction, and the longitudinal axis of the third cone extends in the driving direction, as viewed from above.

20. The device according to claim 5 wherein the longitudinal axes of the first and the second cone extend in the steering direction of the front wheels, and the longitudinal axis of the third cone extends in the steering direction of the front wheels, as viewed from above.

21. The device according to claim 5 wherein the longitudinal axes of the first, second and third cones can be selected freely.

22. A method for automatically switching the lights of a vehicle on and off in response to sensed conditions comprising the steps of:

A) sensing a driving speed of the vehicle;

B) sensing a first value of brightness $H_1$ within a first cone of sensor range extending outwardly in front of the vehicle in a driving direction where the first cone has a large first cone angle, C) sensing a second value of brightness $H_2$ within a second cone of sensor range extending outwardly in front of the vehicle in the driving direction, where a second cone angle of the second cone is smaller than the first cone angle of the first cone;

D) sensing a third value of brightness $H_3$ within a third cone of sensor range extending outwardly in front of the vehicle in the driving direction where the third cone angle of the third cone is smaller than the first cone angle of the first cone;

E) switching the lights of the vehicle on if at least one of;

i) the driving speed is greater than zero and the first, second and third values of brightness $H_1$, $H_2$ and $H_3$ each fall below a minimum value $H_{min,1}$ over a driving distance $S_1$;

ii) the driving speed is greater than zero and the second value of brightness $H_2$ is less than tie first value of brightness $H_1$ by an amount $\Delta H_{min,1}$ over a driving distance $S_1$ and the third value of brightness $H_3$ is greater than the second value of brightness $H_2$ by less than an amount $\Delta H_{min,2}$ over a driving distance $S_1$; and iii) the driving speed is equal to zero and the ignition is switched on and the first, second and third values of brightness $H_1$, $H_2$ and $H_3$ each fall below a minimum value $H_{min,1}$ during a time interval $\Delta T_{min,1}$; and F) switching the lights of the vehicle off if one of:

i) the driving speed is greater than zero and the first, second, and third values of brightness $H_1$, $H_2$ and $H_3$ each exceed a minimum value $H_{min,2}$ over a driving distance $S_1$; and ii) the driving speed is equal to zero and the ignition is switched on and the first, second and third values of brightness $H_1$, $H_2$ and $H_3$ each exceed a minimum value $H_{min,2}$ during a time interval $\Delta T_{min,2}$.

* * * * *